INVENTORS
Arnold Forster
Hansjörg Penker
BY
Walter Becker

INVENTORS:
Arnold Forster
Hansjörg Renker
BY

INVENTORS:
Arnold Forster
Hansjörg Renker
BY

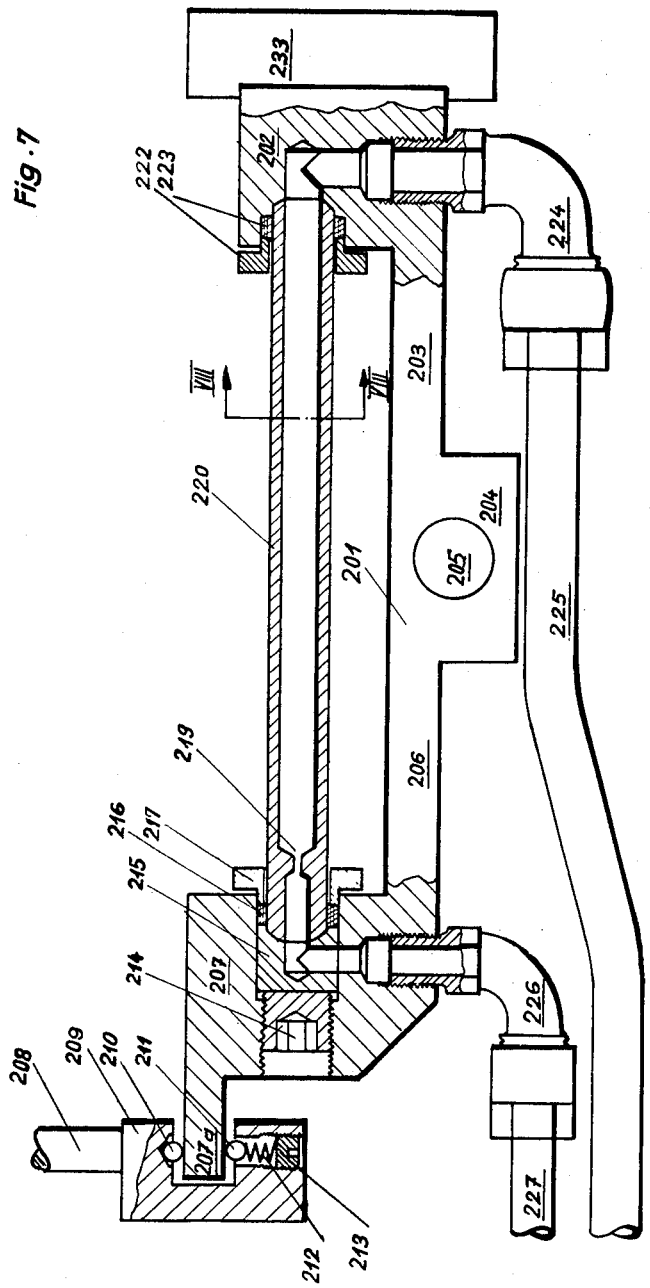

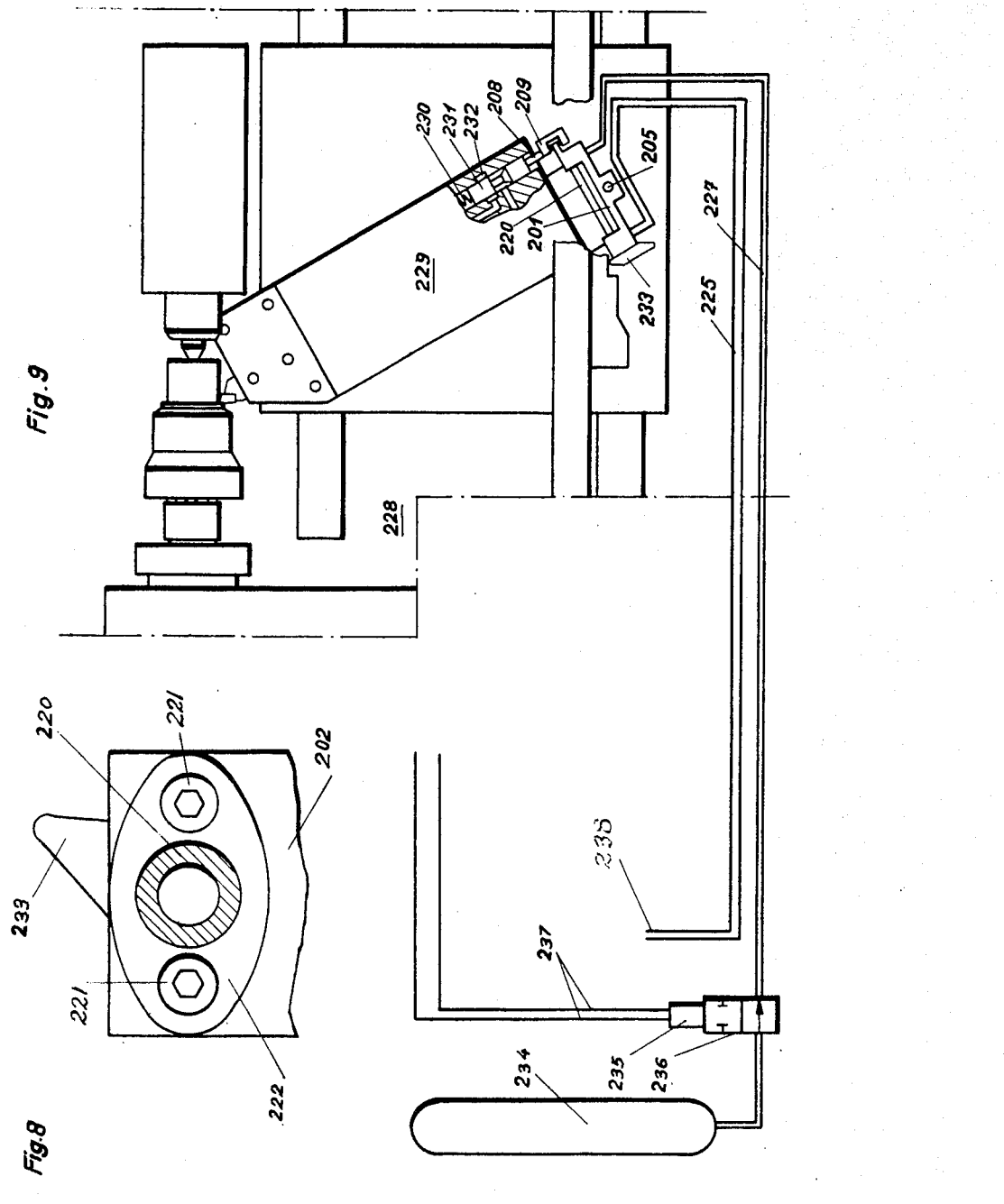

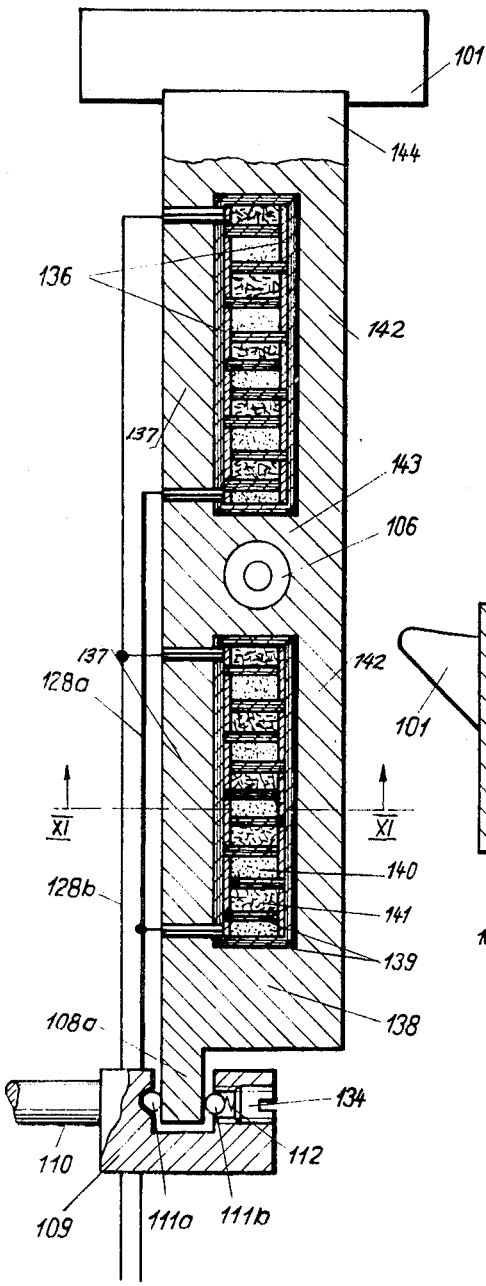
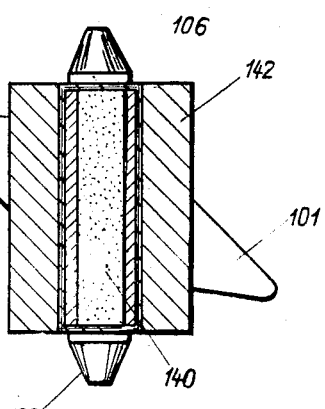
Fig. 10
Fig. 11

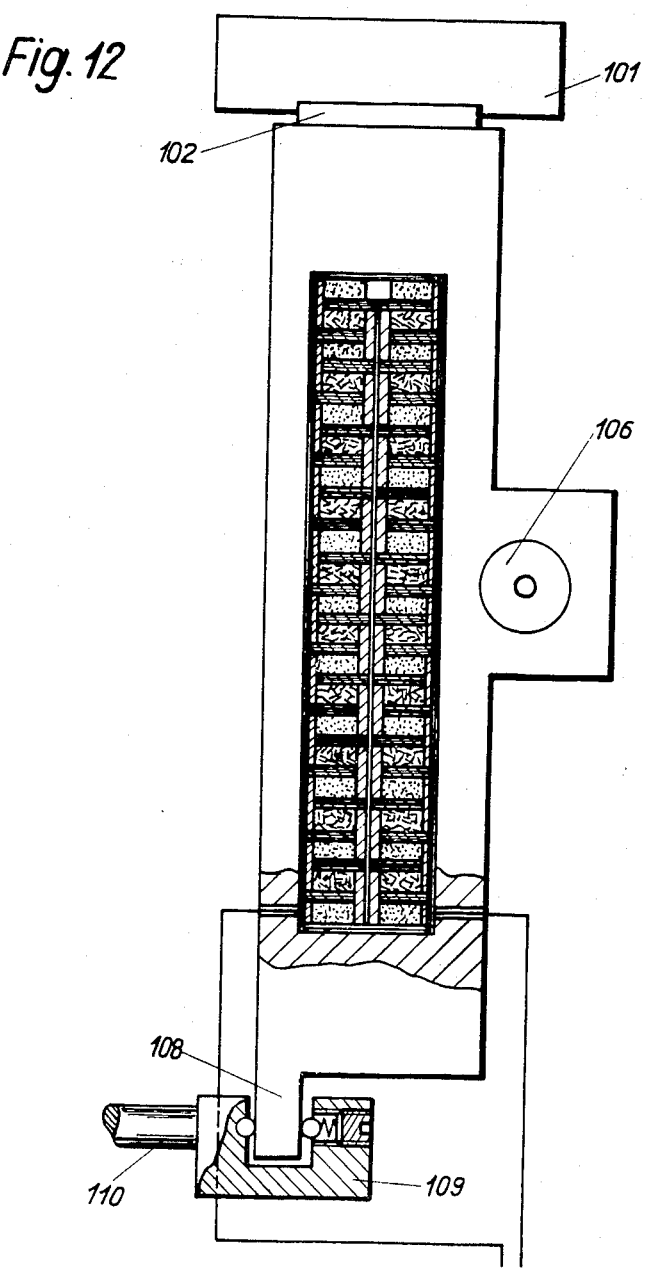

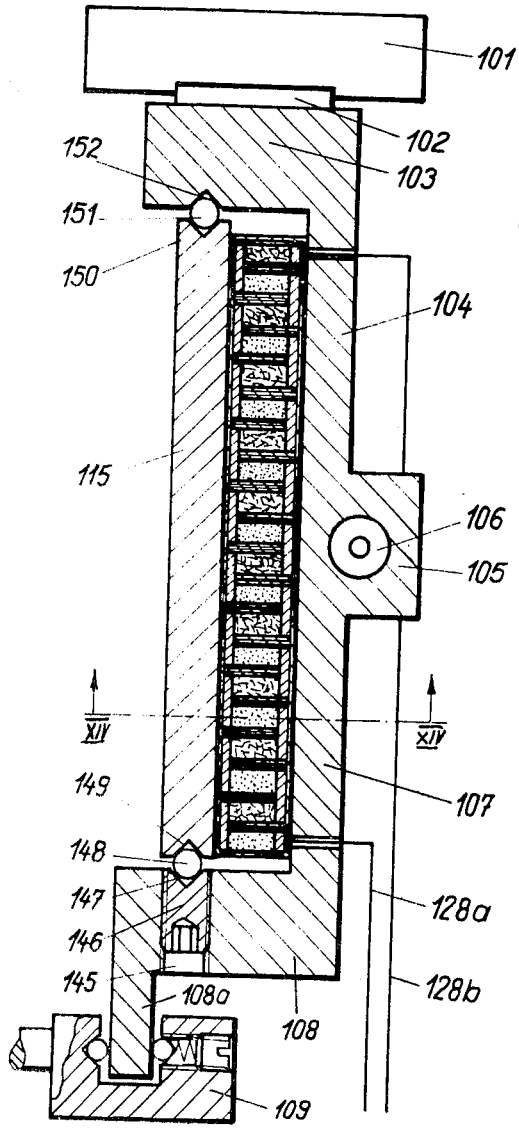

INVENTORS:
Arnold Forster
Hansjörg Ronker
BY Walter Becker

United States Patent Office 3,252,362
Patented May 24, 1966

3,252,362
ARRANGEMENT OF AN EXPANSION ROD IN A MEASURING CONTROL OF MACHINE TOOLS
Arnold Forster, Bad Nauheim, Germany, and Hans Jörg Renker, Schaffhausen, Switzerland, assignors to Georg Fischer Aktiengesellschaft, Schaffhausen, Switzerland
Filed Sept. 28, 1964, Ser. No. 399,741
Claims priority, application Switzerland, Sept. 27, 1963, 11,936; Mar. 17, 1964, 3,406; July 9, 1964, 8,989
17 Claims. (Cl. 82—14)

The present invention relates to a device for utilizing the principle of a measuring control in machine tools in which an expansion rod is employed for purposes of adjusting the relative position of the tool with regard to the workpiece.

A device is known for utilizing the principle of a measuring control by means of an expansion rod heated inductively and in which the position of the holding means for the tool or the workpiece relative to the machine carriage or of the machine carriage relative to the machine bed, is adjusted by said expansion rod. This known device, however, requires a design in which the expansion rod is located within the path of the main flow of force of the machine, which has proved very disadvantageous during the operation of the machine.

It is, therefore, an object of the present invention to provide an arrangement for utilizing the principle of a measuring control by means of an expansion rod, which will overcome the above-mentioned drawbacks.

It is another object of the present invention to provide a device as set forth in the preceding paragraph which will make it possible to arrange the expansion rod outside the range of the main flow of force of the machine tool.

These and other objects and advantages of the invention will appear more clearly from the following specification in connection with the accompanying drawings, in which:

FIGURE 2b is a top view of the feeler level of FIGURE 2a;

FIGURE 7 is a longitudinal section through an expansion rod according to the present invention and adapted to be cooled;

FIGURE 8 is a section taken along the line VIII—VIII of FIGURE 7;

FIGURE 9 illustrates a portion of a hydraulic copying control of a lathe, including a diagrammatic representation of the cooling system for the expansion rod according to FIGS. 7 and 8;

FIGURE 10 illustrates a feeler lever according to the present invention designed as a frame-shaped body including a plurality of Peltier elements;

FIGURE 11 is a section along the line XI—XI of FIGURE 10;

FIGURE 12 shows an adjusting element similar to that of FIGURE 10 but differing therefrom in that it contains two batteries of Peltier elements thermically arranged in series;

FIGURE 13 illustrates an expansion rod provided with a feeler lever and designed as a flat expansion rod;

FIGURE 14 is a section taken along the line XIV—XIV of FIGURE 13;

The arrangement according to the present invention is characterized primarily in that the expansion rod is arranged within the train or the inner structure of the elements of the control system of a machine tool having a copying device.

Figure 1:
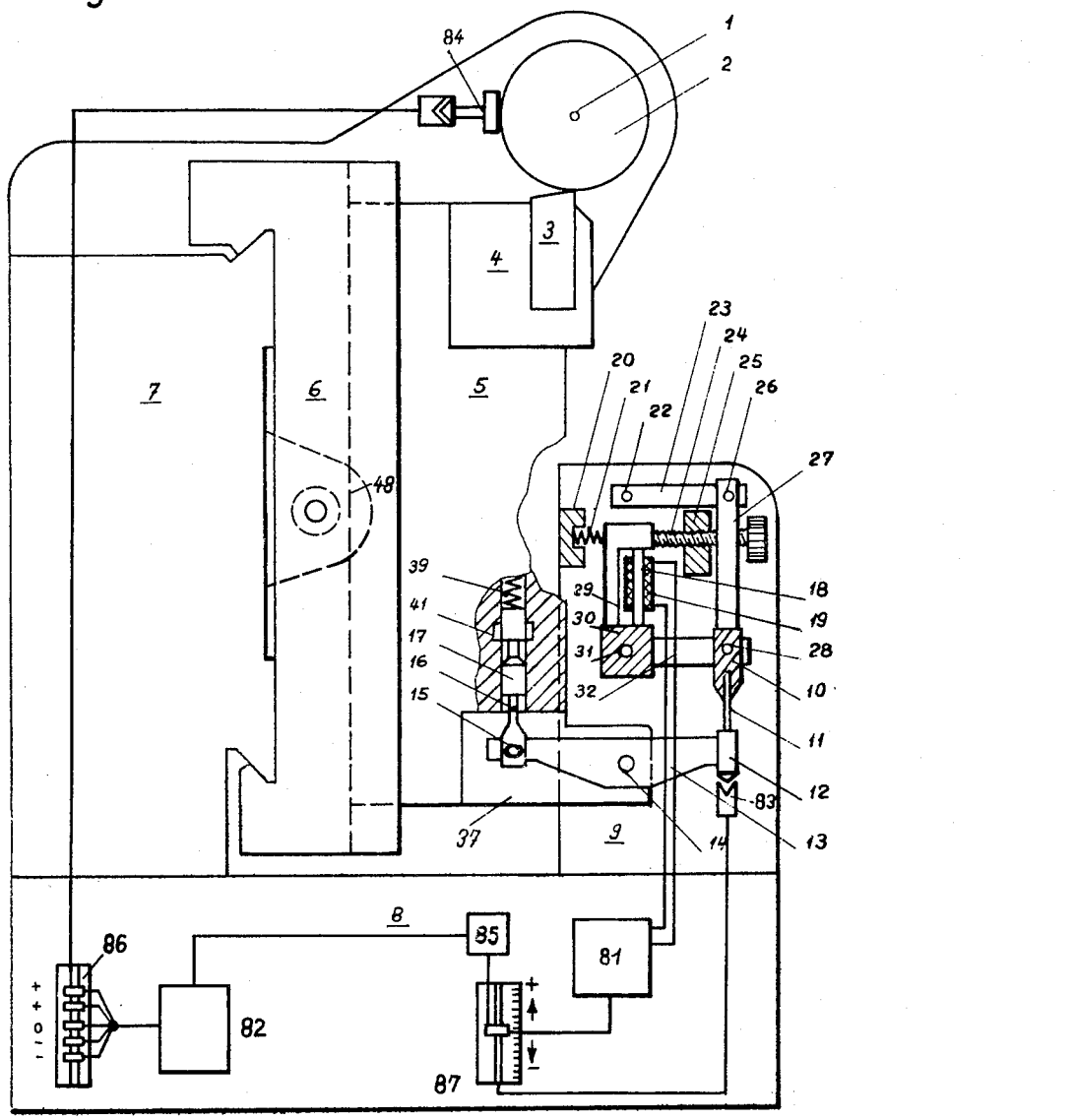
FIGURE 1 shows partly in view and partly in section a copying lathe provided with an expansion rod arranged in the adjusting lever arm of the tiltable templet carrier of the machine.

Referring now to the drawings in detail, FIG. 1 shows the main parts if a copying lathe such as, for example, disclosed in U.S. Patent No. 2,674,145, granted April 6, 1954, carrying a hydraulic copying control system such as, for example, disclosed in U.S. Patent No. 2,645,084, granted July, 14, 1953, and adapted to shape a workpiece 2 rotating about an axis of rotatiin 1. A tool holder 4 with a tool 3 is arranged on a copying carriage 5 displaceably mounted in guiding means 48 of a longitudinal slide or carriage 6. Carriage 6, in turn, is displaceable in guiding means 47 of a machine bed 7 and extending parallel to the axis of rotation 1. Machine bed 7 as well as two lateral stands 9 are arranged on a base 8 (only one of said stands 9 being visible in FIG. 1). Due to the above structure, all parts connected to the lateral stands 9 have a fixed definite position with regard to the axis of rotation 1.

Figure 2:
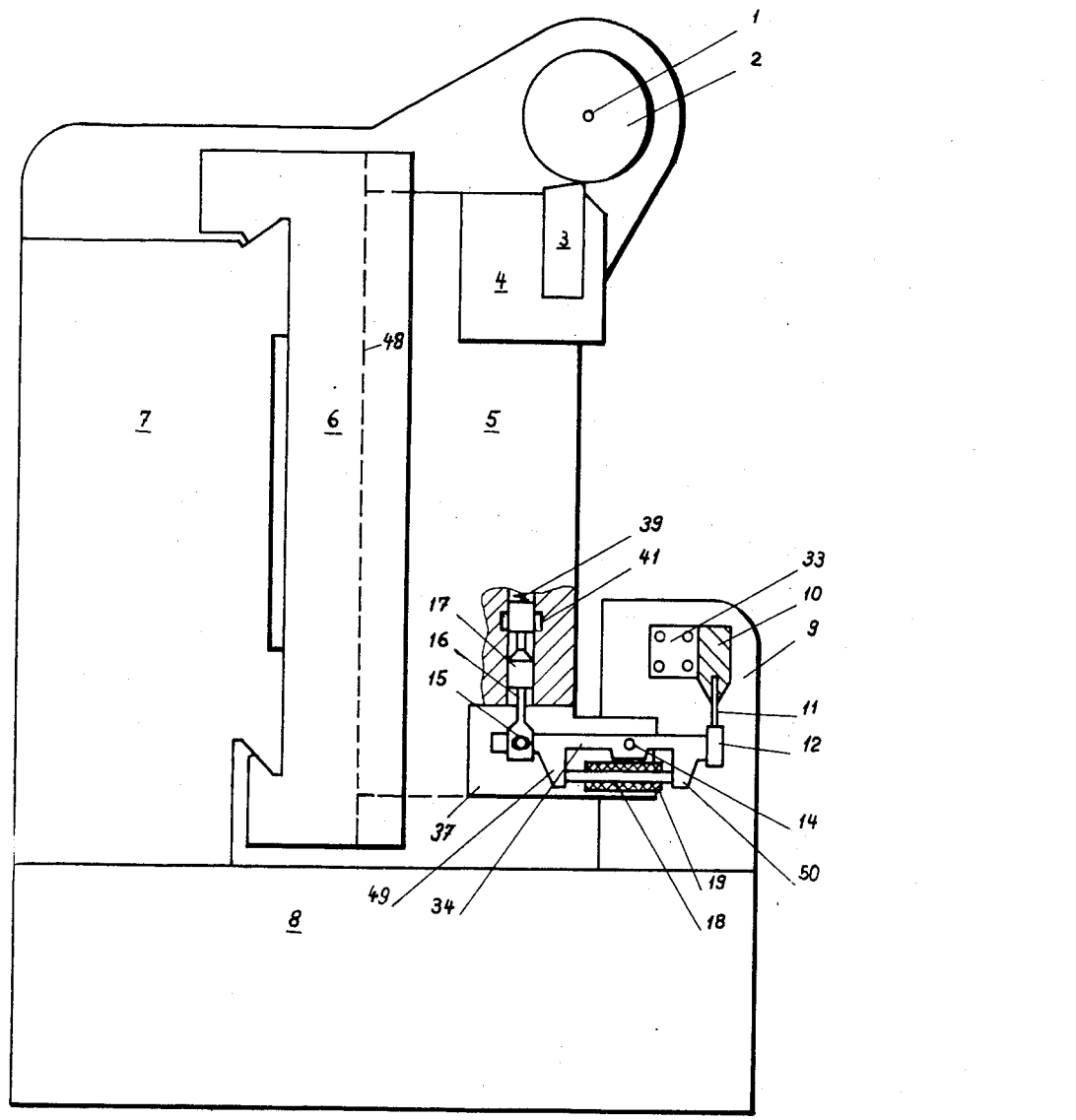
FIGURE 2 shows a lathe similar to that of FIGURE 1 but differing therefrom in that the expansion rod has been inserted in the feeler level of the machine.
Figure 2A:
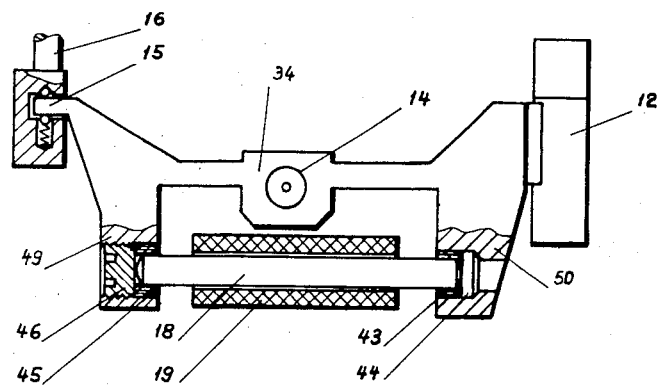
FIGURE 2a shows the feeler level of FIGURE 2 in greater detail.
Figure 2B:
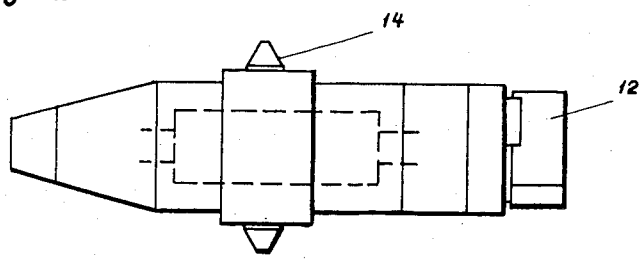

Structural elements (known per se) of a hydraulic copying or profiling control are shown in FIGS. 2, 2a and 2b. These structural elements comprise a templet holder 10 arranged at both lateral stands 9 by means of supporting means 33. Templet holder 10 has connected thereto a copying templet 11 or a master templet or specimen. Furthermore, a feeler head 37 arranged on copying carriage 5 is shown, which carries a feeler lever 13 with a feeler 12 tiltable about a bolt 14. A displacing rod 16 arranged at a control slide 17 is hinged to that end of the feeler lever 13 which is opposite said feeler 12 in a suitable manner by means of a bolt 15. Carriage 5 has provided therein a bore 41a with a control edge 41 for the copying control slide 17, which bore extends parallel to the guiding means 48. In a manner, such as, for example disclosed in U.S. Patent No. 2,674,145, granted April 6, 1954, said control edge 41 effects the control of the hydraulic copying lathe as by controlling the supply of hydraulic fluid to and the discharge of fluid from a hydraulic cylinder and a piston connected between tool side or coyping carriage 6.

FIG. 1 furthermore shows an expansion rod 18 inserted in an adjusting lever arm 29 of a tiltable supporting means 30 which in turn is tiltably journalled on studs 31 in the stands 9. A web 20 with a pressure spring 21 pressing against the lever arm 29 and a web 25 with an adjusting screw 25 are likewise arranged at the lateral stands 9. These last-mentioned elements serve for fine-adjusting the templet 11, as will presently appear.

One web 32 each is provided at both ends of the supporting means 30. Web 32 supports the templet holder 10 by means of studs 28. Templet holder 10 is suspended at a parallellogram-shaped four-link chain comprising a rod 22 connceted to the lateral stands 9 and two parallelogram rods 23 and 27 interconnected by means of studs 26. This construction has been selected to assure that the templet 11 is, even with larger displacements by the adjusting screw 24, not inclined to any material extent with regard to its normal vertical position. Expansion rod 18 is surrounded by a coil 19. Coil 19 is a part of the feed-back control unit, the electric wire diagram of which is shown in FIG. 1. The feed-back control comprises an electrical control unit 82 in connection with a pneumatic measuring device 83, a measuring station 84 for the finished workpiece, and a setting member 85 for dimensional corrections on the copying slide of the lathe. Such correction is effected by deformation of the tracer 12 through an expansion bar 18 which is provided with a high-frequency heat source 81. By varying the temperature of this bar 18, the tracer 12 is deflecting with respect to the tool tip, whereby the turning diameter of the following workpeice 2 is influenced. Each finished workpeice is put into the measuring station 84 and determines the direction and extent of the tracer-feed adjustment by the position of its dimension within a field of tolerence. The dimensional check is made visible in an indicator 86 and is situated in a certain zone of the tolerance range. The distribution into five zones is carried out by photoheads, the central zone not producing any correction, while the two inner zones produce a small tracer change and the two outer zones a relatively large tracer variation. The evaluation of the result of measurement by the control unit leads to a vertical movement of a further photohead on a second indicator 87, which checks the deflection of the tracer and at the same time regulates the high-frequency heating 81 of the expansion bar. The extent of the photohead adjustment may be set independently in two ranges, each movement of the head produces a direct adjustment of the tracer feed and, thus, a dimensional correction.

The operation of the arrangement just described is as follows: Normally, the tool 3 machines the workpiece 2 while the flow of the pressure medium and thereby the position of the copying carriage 5 with regard to the axis of rotation 1 of the workpiece 2 is controlled through the intervention of the feeler 12, the feeler lever 13, and the control slide 17 with the control edge 41.

In case a measuring and control device ascertains, for instance at a workpiece 2 which has just been measured, a diameter too small with regard to the nominal or specified diameter, the control deivec feed electric energy to the coil 19 of the exponsion rod 18 continuously or intermittently so that the expansion rod 18 is heated to a corresponding temperature. A definite length of the expansion rod corresponds to this temperature. The electrical energy fed to the expansion rod is increased until the desired elongation of the expansion rod is obtained. In view of the elongation of the expansion rod 18, the supporting means 30 on stud 31 tilted by a small distance in clockwise direction, whereby the web 32 with the templet holder 10 and the templet 11 is lowered. This, in turn, brings abouta that the control gap at the control edge 41 is varied which in a manner known per se is employed for displacing the carriage 5 with the tool holder 4 and the tool 3 by a certain definite distance away from the axis 1 of the workpiece.

In contrast thereto, in case the diameter of the workpiece is too large, it is possible to displace the copying templet 11 and thereby the carriage 5 in upward direction by conveying a smaller amount of energy to the coil 19.

FIGS. 2, 2a and 2b show a further embodiment according to the present invention in which the expansion rod 18 with its coil 19 is directly mounted in flaps 49 and 50 of an elastic feeler lever 34 tiltable about a bolt 14 and provided with a feeler 12. Expansion rod 18 is held in the flaps 49 and 50 by means of heat insulating sleeves 43, 45 and is supported in axial direction between a disc 44 and a threaded stud 46. Templet 11 is fixedly connected to the lateral stands 9 by means of supporting means 33. As will be evident from the drawing, the lever arms of said feeler lever 34 are bent in upward direction when the expansion rod 18 is elongated due to electric energy being fed to the coil 19.

Figure 3:
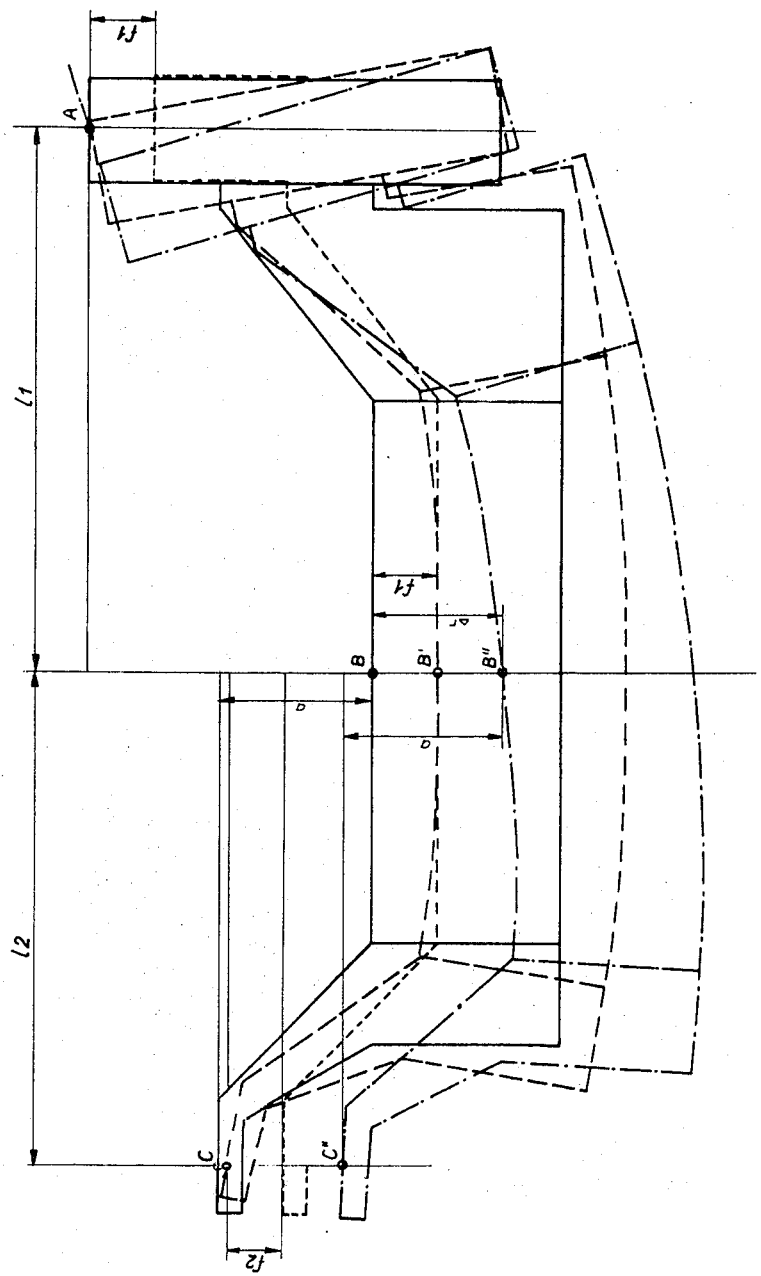
FIGURE 3 shows the feeler level of FIGURES 2, 2a and 2b in deformed condition.

The mathematical function of adjustment of a feeler lever as shown in FIG. 2 is illustrated in FIG. 3. Point A represents the point of contact between the feeler 12 and the templet 11, while point B represents the connecting point between the feeler lever 34 and the carriage 5 and thereby the position of the carriage 5 with regard to the templet 11. Point C finally represents the connection to the control slide 17 and thereby to the control edge 41. The straight unbent form of the feeler lever in engagement with the templet 11 is shown in full-lines in FIG. 3, whereas the same lever displaced in downward direction by a distance $f_1$ is shown in dot-dash lines in FIG. 3. Said distance $f_1$ represents the displacement of the point A relative to point B in bent condition of the feeler lever 34 (shown in dash-lines). The distance $a$ between the points B and C is maintained due to the particular structure of the copying system. The distance between the points B' and C' of the bent feeler lever 34 in the horizontal position (shown in dash-lines) is larger than the distance $a$ by a distance $f_2$. The copying carriage 5, therefore, can move in downward direction by the distance B'–B'' whereby the feeler lever occupies the inclined position shown in dot-dash lines until the distance B''–C'' equals $a$. The geometrical relationship for the total displacement of the copying carriage thus reads:

$$\Delta r = B - B' + B' - B'' = f_1 + \frac{l_1}{l_2} \cdot f_2$$

Figure 4:
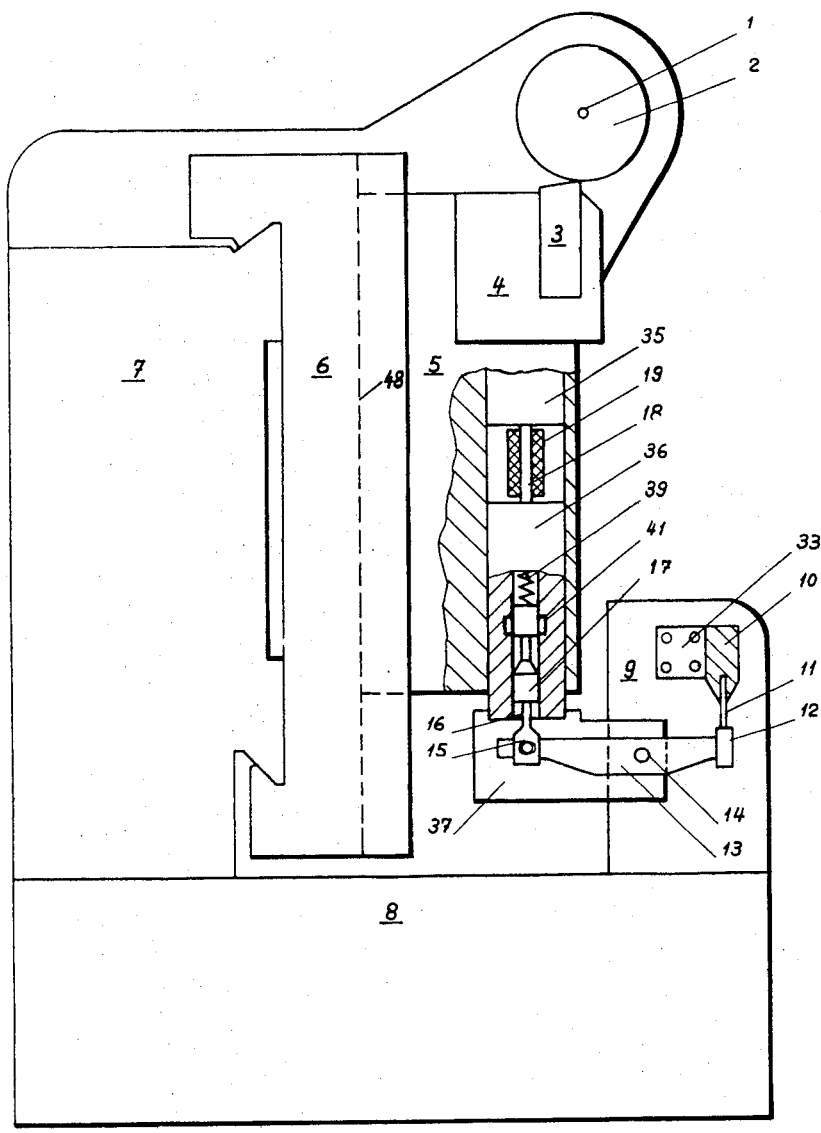
FIGURE 4 shows a copying lathe similar to that of FIGURE 1 but differing therefrom in that the expansion rod cooperates with an adjustable control column in the machine.

FIG. 4 shows a further embodiment according to the present invention which is of particular advantage in case a control column 36 displaceably mounted in the carriage 5 carries the feeler head 37, the feeler lever 13, and the control slide 17. Expansion rod 18 interconnects a displaceable control column portion 36 with a control column portion 35 which in turn is connected to the carriage 5 by suitable means (not shown). In the event of an elongation of the expansion rod 18, the carriage 5 is so-to-speak displaced relative to the whole copying control system, which control system has a constant position with regard to the axis of rotation 1 through the intervention of the templet 11.

Figure 5:
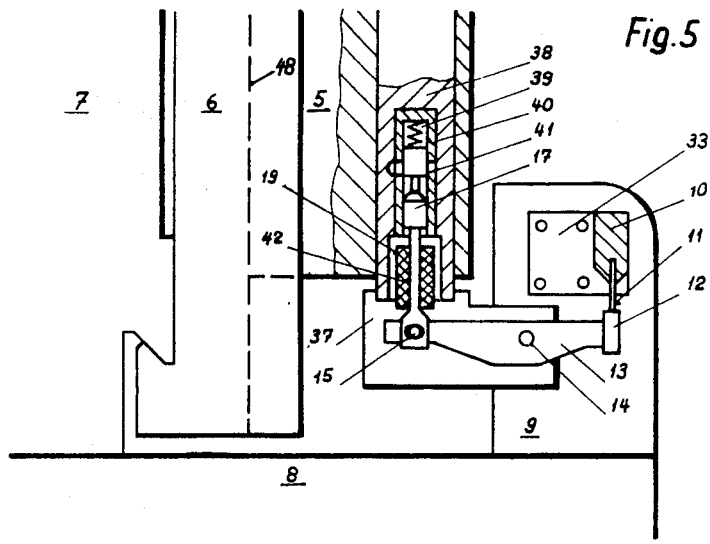
FIGURE 5 illustrates a partial section through the hydraulic copying control members of a lathe according to the present invention provided with an expansion rod designed as slide rod.

In the arrangement shown in FIG. 5, the expansion rod 42 is inserted between the feeler lever 13 and the control slide 17 so as to form a connecting rod. The mathematical function of adjustment is in this instance very similar to that of the elastic feeler lever 34 in FIG. 2. When the expansion rod 42 is elongated, the distance between the supporting point 14 of the feeler lever and the control edge 41 arranged in a sleeve 40 of the control column 38 becomes too great (when looking in vertical direction with regard to the figure) and the copying carriage 5 has to be moved downwardly so that the feeler lever 13 occupies an inclined position and so that the normal spacing between the feeler lever supporting point 14 and the control edge 41 is being restored. It is, of course, to be understood that the opposite holds true in case the expansion rod 18 is contracted.

Figure 6:
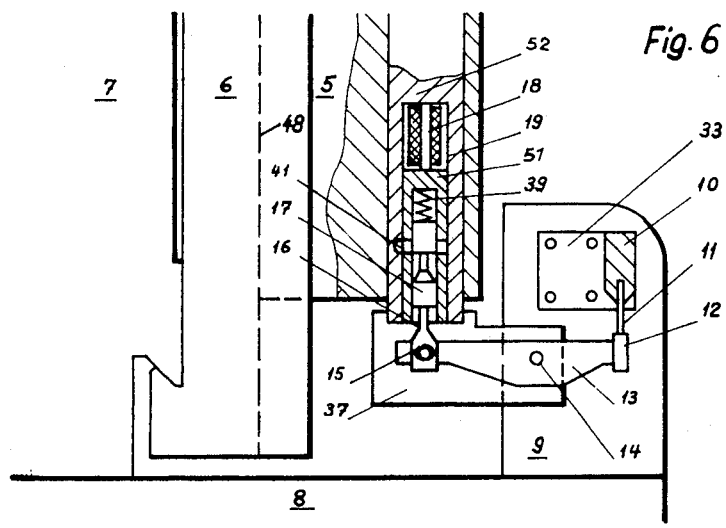
FIGURE 6 shows a partial section similar to that of FIGURE 5 but differing therefrom in that the expansion rod is adapted to displace a sleeve within the copying unit of the machine.

According to a further embodiment of the present invention shown in FIG. 6, the expansion rod 18 is arranged between a control column 52 and a sleeve 51 displaceably mounted in said column 52 and provided with the control edge 41. When the expansion rod 18 is elongated, the distance between the journal 14 of the feeler lever and the control edge 41 is decreased. The carriage 5, therefore, has to be moved in downward direction and the feeler lever 13 has to be tilted in downward direction so that the control edge 41 of the control slide assumes the decreased distance from the feeler lever journal 14.

FIGS. 7 to 9 illustrate a still further embodiment of the present invention in which means for cooling the expansion rod by evaporating a cooling agent are provided for producing changes in length of the expansion rod. With the embodiment shown in FIG. 7, an expansion rod 220 is arranged at a two-arm feeler lever 201 with a central portion 204 and a feeler lever journal 205. Feeler lever arms 203 and 206 extending toward both sides carry the expansion rod 220 between two holding means extending perpendicularly thereto, i.e. a feeler carrier 202 with a feeler 233 on one hand and an expansion rod holder 207 of the feeler lever on the other hand. Expansion rod 220 is hollow, and that end of said rod where the cooling agent is introduced is provided with a narrow portion which serves as evaporating nozzle 219 for the cooling agent. The cooling agent is conveyed through a conduit 227 and a connecting piece 226 and flows out at the other end or is discharged through a connecting piece 224 and a return conduit 225. For purposes of sealing the hollow chamber of the expansion rod, both ends of said rod are provided with sealing means 216 and 223 respectively, stuffing boxes 217 and 222 respectively, and tensioning screws 221 (see FIG. 8). In order to be able easily to assemble and disassemble the expansion rod 220, the holding means 207 for the expansion rod is provided in axial direction with a bore and the expansion rod is clamped by means of a threaded stud 214 and a pressure piece 215.

The actuation of the hydraulic copying control (not visible in FIG. 7) is effected by a control nose 207a provided at the holding means 207. Nose 207a engages a connecting or control head 209 mounted at the end of a control slide rod 208 and may be journalled therein, for instance by means of bolts 210 and 211. In order to assure an almost play-free transmission of the movement, a pressure spring 212 for the bolt 211 is provided at the control head 209. The pressure of the pressure spring 212 is adjustable by means of a screw 213.

The hydraulic copying control shown in FIG. 9 comprises a copying carriage 229 in which there is arranged a control slide rod 208 one end of which is provided with the connecting or control head 209. As has been mentioned above, the head 209 is connected to the feeler lever 201. Conduit 227 is connected to a container 234 for a cooling agent and designed as a pressure container, through the intervention of a two-way valve 236 which is preferably actuated electrically and is combined with a switch mechanism 235. The return conduit 225 may, depending on the cooling agent, be connected either to an outlet opening 238 communicating with the atmosphere or in any convenient manner to a container for the cooling agent.

The adjustment of the position of the tool relative to the workpiece is also with the above-described arrangement effected by an elongation of the expansion rod brought about in the following manner: A measuring control device of the machine opens the two-way valve 236 through the intervention of a control signal conveyed to the switching mechanism 235 by conduits 237 and thereby opens the passage for a cooling agent in the container 234 to the expansion rod 220. Liquid carbon dioxide may, for instance, be employed as cooling agent. The cooling agent flows through the evaporation nozzle 219 into the hollow chamber of the expansion rod 220 where it evaporates and absorbs heat from the expansion rod 220 and thus brings about a contraction of the same. If the contraction of the rod 220 necessary for correcting the relative position thereof has been obtained, the two-way valve 236 is closed by the measuring control device and is not opened until the expansion rod 220 is, in view of heat absorption from the environment, elongated beyond a certain permissible amount determined by the meausring control device. In case the measuring control device requires an elongation of the expansion rod, the two-way valve 236 is closed and the elongation of the expansion rod is accelerated, for instance by conveying a certain amount of heat to the expansion rod. For this purpose, a suitable heating means not shown in the drawing could be provided besides the cooling device described above.

Whereas carbon dioxide as cooling agent yields the advantage that it is non-poisonous and can therefore be released to the atmosphere as described, it is, of course, to be understood that also other cooling agents may be employed. Thus, for instance, a closed cooling circuit for the expansion rod may be provided while employing $NH_3$, $SO_2$, a halogen hydrocarbon or any other suitable cooling agent. In this instance, the cooling agent could be returned from the return conduit, for instance by means of a compressor, into a container preferably designed as heat exchanger.

The above-described arrangement yields the advantage of a large cooling power which, in addition thereto, can be made adjustable by varying the cross-section of the nozzle. This available large cooling power, in its turn, assures a very fast change in the length of the expansion rod, especially in cooperation with a powerful heating means for the expansion rod. This last-mentioned arrangement can be of particular advantage for shortening the adjusting periods of the expansion rod and thereby the periods during which the machine has to be at a standstill.

According to a further embodiment, the problem underlying the present invention has been solved by providing means for producing temperature changes which bring about variations in length of an adjusting element by thermoelectric means while utilizing the so-called Peltier effect. The structure and function of such thermoelectric means are shown in FIGS. 10 to 17.

The adjusting element shown in FIGS. 10 and 11 is designed as a body having the form of a frame and serving as feeler lever for the copying device. It consists of two longitudinal webs 137 and 142, respectively, two cross-bars 138 and 144, and a cross-bar 143 required for journalling the feeler lever. Cross-bar 144 simultaneously serves as supporting means for the feeler 101. Cross-bar 143 is tiltably journalled on a stud 106 connected to a feeler head 37.

For purposes of actuating the hydraulic copying control, the feeler lever has that end thereof which is opposite the feeler 101 provided with an extension 108a engaging a slide rod head 109 provided at the end of a control slide rod 110. Extension 108a may be journalled in said head 109, for instance between balls 111a and 111b. In order to assure a transmission of the movement as play-free as possible, a pressure spring 112 acting upon the ball 111b is provided at the head 109 while an adjusting screw 134 serves for adjusting the necessary pressure of the spring.

A battery of Peltier elements is inserted between the two longitudinal webs 137 and 142 and is separated by the cross-bar 143. This battery consists of a number of p and n semi-conductor elements 141 and 140 alternately interconnected by contacting plates 136. Electric insulations 139 surround the conductive parts of the battery and combine the same in a manner known per se so as to form a block-like unit. In customary manner, two consecutive semi-conductor legs with the contacting plates pertaining thereto are called Peltier element and a plurality of such elements electrically arranged in series is called a battery. The battery designed in the above-described manner is connected to a control device (not shown) by means of electric conduits 128a and 128b through the intervention of which direct current may selectively be fed to said Peltier battery in one or the other direction.

In view of the operation of such Peltier elements or batteries, which is very well known, the described arrangement makes it possible, depending on the magnitude and direction of the current sent through said Peltier elements, to cool the longitudinal web 137 and to heat the longitudinal web 142, or makes it possible to reverse the heat transfer. When heating up the longitudinal web 142, the frame-like feeler lever is deformed in the manner shown in FIG. 3 whereby a displacement of the relative position of the tool with regard to the workpiece is effected, which displacement has likewise been described in connection with FIG. 3. In contrast thereto, a cooling of the longitudinal web 137 brings about a deformation in opposite direction and therefore results in a displacement in opposite direction. The deformation of the frame-like adjusting element has the characteristics of a bending.

With the modification shown in FIG. 12 of an adjusting element, the feeler lever is likewise designed as a frame-like body. The interior of said frame-like body is provided with two Peltier batteries arranged one on top of the other and arranged in series as to the heat potential whereby the degree of efficiency of the unit is increased.

In the further modification shown in FIGS. 13 and 14, the upper longitudinal web is designed as a separate extension rod 115 which is clamped between two holding means extending perpendicularly to said rod, viz. the feeler carrier 103 and the feeler 101 connected to an extension 102 on one hand and the expansion rod holding means 108 on the other hand. Starting with the central portion 105 and the journalling stud 106 of the adjusting element, the feeler carrier 103 and the expansion rod holding means 108 are connected with the central portion 105 of the adjusting element through the intervention of the feeler lever arms 104 and 107. A control extension 108a is arranged at the expansion rod holding means 108 and engages the slide rod head 109.

The expansion rod 115 is at both ends held by balls 148 and 151 which are embedded in two oppositely located recesses 147 and 149 in the holding means 108 and the rod 115 on one hand, and in two oppositely located recesses 150 and 152 in the feeler holder 103 and the rod 115 on the other hand. The recess 147 arranged in the rod holder 108 is arranged at a threaded pin 146 screwed into a threaded bore 145 of the holder 108. This threaded pin 146 serves for clamping the expansion rod 115 between the holding means and to keep the same in the proper place.

A Peltier battery is arranged between the expansion rod 115 and the feeler lever arms 104 and 107. This Peltier battery receives its energy from a control device through the intervention of the electric conductors 128a and 128b while said battery, depending on the direction of flow of the current, heats up the expansion rod 115 and cools the feeler lever arms 104 and 107, or vice versa. The expansion rod 115 is with this embodiment of the adjusting element subjected substantially to a variation in length whereas the feeler lever, as shown in FIG. 3, is subjected to a deformation.

Figure 15:
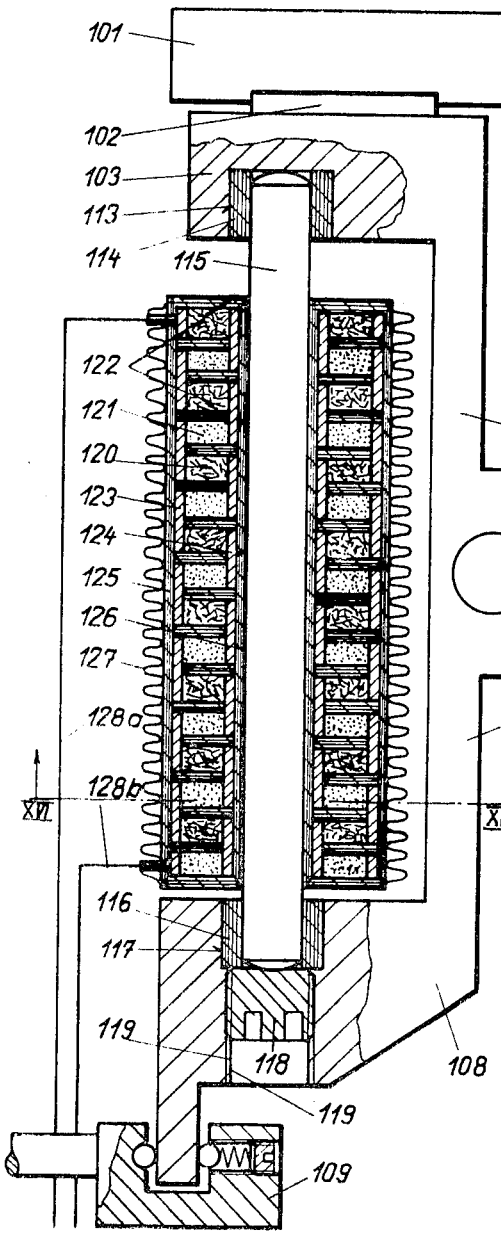
FIGURE 15 illustrates a longitudinal section through an expansion rod according to the present invention inserted in a feeler lever of the copying unit and provided with a jacket of thermoelectric Peltier elements.

The further embodiment illustrated in FIG. 15 comprises a round expansion rod 115 inserted in a feeler lever according to the embodiment shown in FIG. 2a. The expansion rod is on one hand journalled in a bore 113 of the feeler carrier 103 and on the other hand in a bore 117 of the expansion rod holder 108. For purposes of preventing a heat transfer in the holding means of the feeler lever, the bores 113 and 117 are provided with suitable heat insulating pieces 114 and 116, for instance in the form of rings or sleeves. In order to be able easily to insert and remove the expansion rod 115, the expansion rod holder 108 is provided with a bore in the axial direction of said rod and with a thread 119. In this way the expansion rod 115 can be clamped in a very easy manner by means of a threaded pin 118 which simultaneously may serve for adjusting a suitable preload of the feeler lever.

According to a still further and preferred embodiment of the present invention, the expansion rod 115 is for purposes of selectively cooling or heating the same, surrounded by a casing or jacket formed by a plurality of thermoelectric Peltier elements of suitable semi-conductor material.

Figure 16:
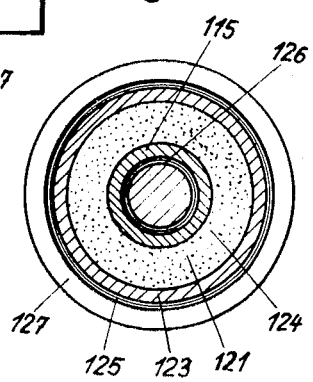
FIGURE 16 is a section taken along the line XVI—XVI of FIGURE 15.

An example of such a jacket for the expansion rod shown in FIG. 15 is illustrated in FIG. 16. The jacket of the expansion rod consists of a suitable number of p and n semi-conductor rings 120 and 121 alternately arranged between outer and inner contacting sleeves 123 and 124 and separated by insulating discs 122. The heating or cooling jacket has its inside and outside provided with suitable insulating layers 126 and 125, and the outer surface of the jacket is in addition thereto provided with a heat transfer coating 127 preferably designed in the manner of a heat exchanger. The Peltier jacket formed in such a manner is connected to a control device (not shown) by electric conductors 128a and 128b through the intervention of which direct current is selectively fed in one direction or the other to said Peltier battery.

Figure 17:
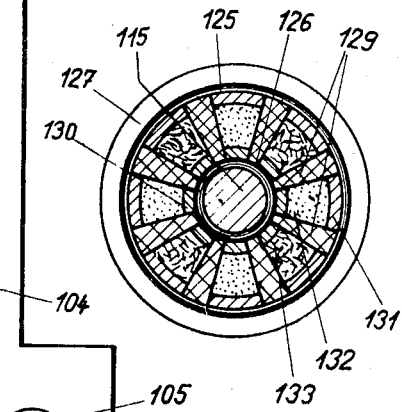
FIGURE 17 is a section similar to that of FIGURE 16 but differing therefrom in that the jacket is composed of segment-shaped batteries.

A further embodiment of a jacket for the expansion rod 115 is shown in FIG. 17. In this instance, the jacket comprises segments 132 and 133 of n and p semi-conductor material and arranged in series while the segments are alternately connected to each other in series by inner and outer contacting segments 130 and 121. Due to this arrangement, rod-shaped individual batteries of semi-conductor elements are formed which are arranged around the expansion rod 115 and are electrically separated from each other by insulating strips 129 so that a jacket completely enclosing the expansion rod 115 is formed while said jacket is electrically separated from said rod 115 by a further insulating layer 126.

The arrangement according to the present invention yields the advantage that in addition to a heating of the expansion rod, it makes possible a heating *and* a cooling of the expansion rod and that both manners of operating the rod (heating or cooling) may become effective in one and the same relatively simple structural unit.

The device described above and shown in various embodiments and combinations yield the advantage that the adjustment of the length can be effected at structural elements which are not subjected to the main flow of force of the machine tool but merely have to convey the relatively weak flow of the control force. The expansion rod does not have to displace heavy machine carriages, tool holding means or machining units, but merely light elements of the control system in which a small variation in length can be transferred by a geometrically suitable arrangement into a larger displacement of adjustment.

When the expansion rod has to produce elastic deformations in the structural elements of the device, it has to support the forces required therefor. These forces, however, are small and constant whereas the main flow of force of a machine tool is very often subjected to great variations.

It is, of course, to be understood that the present invention is, by no means, limited to the particular constructions shown in the drawings, but also comprises any modifications within the scope of the appended claims. Thus, it is to be understood that while the invention has been illustrated in connection with copying lathes with a single machining tool, it is also applicable with other machine tools and if desired, with machines employing a plurality of tools.

What is claimed is:
1. In a copying machine having a base, a carriage slidable on the base, a tool slide slidable on the carriage, a template carried by the base, motor means connected between the slide and the carriage and a template follower: control means operatively connecting said template follower to said motor means in controlling relation thereto comprising a control device operatively connected to said motor means and having a first element on the slide and also having a second element, said elements being movable relative to each other to control the supply of energy to said motor means, said control means also comprising linkage means connecting said follower with said second element, and an expansible member operatively connected to at least one of said first and second elements and operable upon a change in condition of expansion thereof to cause relative movement between said first and second elements thereby to cause said motor means to move said slide in conformity with said change in condition of expansion of said expansible member.

2. A copying machine according to claim 1 in which means are provided for controlling the condition of expansion of said expansible member.

3. A copying machine according to claim 1 in which means are provided for controlling the temperature of said expansible member thereof to control the said condition of expansion thereof.

4. A copying machine according to claim 1 which includes a four lever arm parallelogram linkage supporting said template on said bed, and said expansible member being operatively associated with one of said lever arms so as to effect movement of said template in response to a change in condition of expansion of said member.

5. A copying machine according to claim 1 in which said linkage means includes a pivotally supported lever, projections upstanding from said lever in spaced relation to each other, and said member being disposed between said projections with its ends in engagement therewith whereby changes in the condition of expansion of said member will cause bending of said lever.

6. A copying machine according to claim 1 in which said expansible member is connected between said slide and said first element in such a manner that changes in the condition of expansion of said member will move said first element in the same direction as said second element is moved by said follower.

7. A copying machine according to claim 1 in which said expansible member is connected between said second element and said linkage means in such a manner that changes in the condition of expansion of said member will move said second element in the same direction as said second element is moved by said follower.

8. In a copying machine having a base, a carriage slidable on the base, a tool slide slidable on the carriage, a template carried by the base, motor means connected between the slide and the carriage and a template follower: control means operatively connecting said template follower to said motor means in controlling relation thereto comprising a control device operatively connected to said motor means and having a first element on the slide and also having a second element, said elements being movable relative to each other to control the supply of energy to said motor means, said control means also comprising linkage means connecting said follower with said second element, and an expansible member operatively connected to at least one of said first and second elements and operable upon a change in condition of expansion thereof to cause relative movement between said first and second elements thereby to cause said motor means to move said slide in conformity with said change in condition of expansion of said expansible member, said expansible member being sensitive to a change in temperature for a change in the condition of expansion thereof, and means for effecting heat exchange between said member and a cooling agent.

9. In a copying machine having a base, a carriage slidable on the base, a tool slide slidable on the carriage, a template carried by the base, motor means connected between the slide and the carriage and a template follower: control means operatively connecting said template follower to said motor means in controlling relation thereto comprising a control device operatively connected to said motor means and having a first element on the slide and also having a second element, said elements being movable relative to each other to control the supply of energy to said motor means, said control means also comprising linkage means connecting said follower with said second element, and an expansible member operatively connected to at least one of said first and second elements and operable upon a change in condition of expansion thereof to cause relative movement between said first and second elements thereby to cause said motor means to move said slide in conformity with said change in condition of expansion of said expansible member, said expansible member being sensitive to a change in temperature for a change in the condition of expansion thereof, said member being hollow, and means for passing a cooling agent through said member.

10. In a copying machine having a base, a carriage slidable on the base, a tool slide slidable on the carriage, a template carried by the base, motor means connected between the slide and the carriage and a template follower: control means operatively connecting said template follower to said motor means in controlling relation thereto comprising a control device operatively connected to said motor means and having a first element on the slide and also having a second element, said elements being movable relative to each other to control the supply of energy to said motor means, said control means also comprising linkage means connecting said follower with said second element, and an expansible member operatively connected to at least one of said first and second elements and operable upon a change in condition of expansion thereof to cause relative movement between said first and second elements thereby to cause said motor means to move said slide in conformity with said change in condition of expansion of said expansible member, said expansible member being sensitive to a change in temperature for a change in the condition of expansion thereof, said member being hollow and having an orifice therein near one end, and means for passing an evaporatable cooling agent through said member from said one end to the other end thereof and which agent evaporates in passing through said orifice.

11. In a copying machine according to claim 10 in which said cooling agent is selected from the class comprising $CO_2$, $NH_3$, and a halogen hydrocarbon.

12. In a copying machine having a base, a carriage slidable on the base, a tool slide slidable on the carriage, a template carried by the base, motor means connected between the slide and the carriage and a template follower: control means operatively connecting said template follower to said motor means in controlling relation thereto comprising a control device operatively connected to said motor means and having a first element on the slide and also having a second element, said elements being movable relative to each other to control the supply of energy to said motor means, said control means also comprising linkage means connecting said follower with said second element, and an expansible member operatively connected to at least one of said first and second elements and operable upon a change in condition of expansion thereof to cause relative movement between said first and second elements thereby to cause said motor means to move said slide in conformity with said change in condition of expansion of said expansible member, and means associated with said member, and means associated with said member in heat exchange relation therewith comprising electrically operable means exhibiting a Peltier effect whereby to effect a change in the condition of expansion of said member by changing the temperature thereof.

13. In a copying machine according to claim 12 in which said member is frame-like with spaced webs, and said electrically operable means extend between said webs and operable for effecting heat exchange between said webs.

14. A copying machine according to claim 13 in which said electrically operable means include two serially arranged units between said webs in additive relation.

15. In a copying machine having a base, a carriage slidable on the base, a tool slide slidable on the carriage, a template carried by the base, motor means connected between the slide and the carriage and a template follower: control means operatively connecting said template follower to said motor means in controlling relation thereto comprising a control device operatively connected to said motor means and have a first element on the slide and also having a second element, said elements being moveable relative to each other to control the supply of energy to said motor means, said control means also comprising linkage means connecting said follower with said second element, and an expansible member operatively connected to at least one of said first and second elements and operable upon a change in condition of expansion thereof to cause relative movement between said first and second elements thereby to cause said motor means to move said slide in conformity with said change in condition of expansion of said expansible member, and means associated with said member in heat exchange relation therewith comprising electrically operable means exhibiting a Peltier effect whereby to effect a change in the condition of expansion of said member by changing the temperature thereof, said electrically operable means comprising thermoelectric elements in surrounding relation to said member.

16. In a copying machine having a base, a carriage slidable on the base, a tool slide slidable on the carriage, a template carried by the base, motor means connected between the slide and the carriage and a template follower: control means operatively connecting said template follower to said motor means in controlling relation thereto comprising a control device operatively connected to said motor means and having a first element on the slide and also having a second element, said elements being moveable relative to each other to control the supply of energy to said motor means, said control means also comprising linkage means connecting said follower with said second element, and an expansible member operatively connected to at least one of said first and second elements and operable upon a change in condition of expansion thereof to cause relative movement between said first and second elements thereby to cause said motor means to move said slide in conformity with said change in condition of expansion of said expansible member, and means associated with said member in heat exchange relation therewith comprising electrically operable means exhibiting a Peltier effect whereby to effect a change in the condition of expansion of said member by changing the temperature thereof, said electrically operable means including a first plurality of inner conductive sleeves mounted in spaced relation on said member, a second plurality of outer conductive sleeves in concentric surrounding relation to said first plurality of sleeves, semi-conductor elements arranged between said inner and outer sleeves so as to be in series with each other, and insulating discs between adjacent ones of said elements.

17. In a copying machine having a base, a carriage slidable on the base, a tool slide slidable on the carriage, a template carried by the base, motor means connected between the slide and the carriage and a template follower: control means operatively connecting said template follower to said motor means in controlling relation thereto comprising a control device operatively connected to said motor means and having a first element on the slide and also having a second element, said elements being moveable relative to each other to control the supply of energy to said motor means, said control means also comprising linkage means connecting said follower with said second element, and an expansible member operatively connected to at least one of said first and second elements and operable upon a change in condition of expansion thereof to cause relative movement between said first and second elements thereby to cause said motor means to move said slide in conformity with said change in condition of expansion of said expansible member, and means associated with said member in heat exchange relation therewith comprising electrically operable means exhibiting a Peltier effect whereby to effect a change in the condition of expansion of said member by changing the temperature thereof, said electrically operable means including a plurality of inner contact segments surrounding said member, a plurality of outer contact segments radially spaced from said inner segments, wedge shaped semi-conductor elements extending between respective pairs of said inner and outer segments so the elements are connected in series in the longitudinal direction of said member, and insulating wedges between said semi-conductor elements.

References Cited by the Examiner

UNITED STATES PATENTS 3,066,578   12/1962   Olton _____ 82—900

WILLIAM W. DYER, JR., *Primary Examiner.*

G. A. DOST, *Assistant Examiner.*